United States Patent [19]
Sankey et al.

[11] Patent Number: 5,800,911
[45] Date of Patent: Sep. 1, 1998

[54] POLYMERIC SHEET

[75] Inventors: Stephen William Sankey; Mark Edward Dawes, both of Northallerton; Paul David Lawrence, Middlesbrough, all of United Kingdom

[73] Assignee: Imperial Chemical Industries PLC, London, England

[21] Appl. No.: 821,582

[22] Filed: Mar. 19, 1997

Related U.S. Application Data

[63] Continuation of Ser. No. 434,322, May 2, 1995, abandoned, which is a continuation of Ser. No. 174,483, Dec. 28, 1993, abandoned.

[30] Foreign Application Priority Data

Dec. 29, 1992 [GB] United Kingdom ............... 9227031

[51] Int. Cl.$^6$ ............... B32B 5/16; B32B 7/02; B32B 27/36; B32B 31/30
[52] U.S. Cl. ............. 428/213; 264/173.16; 264/173.18; 264/211.12; 428/215; 428/220; 428/328; 428/334; 428/343; 428/480; 428/483; 428/910
[58] Field of Search ................... 428/213, 215, 428/219, 220, 325, 327, 328, 329, 330, 331, 343, 332, 340, 334, 335, 336, 337, 480, 483, 910; 264/173.16, 173.18, 211.12

[56] References Cited

U.S. PATENT DOCUMENTS

| | | | |
|---|---|---|---|
| 4,880,700 | 11/1989 | Charmot et al. | 428/337 |
| 4,927,675 | 5/1990 | Adams et al. | 428/35.9 |
| 5,171,625 | 12/1992 | Newton | 428/195 |

FOREIGN PATENT DOCUMENTS

| | | | |
|---|---|---|---|
| 0053498 | 6/1982 | European Pat. Off. . | |
| 0199228 | 10/1986 | European Pat. Off. . | |
| 0312226 | 4/1989 | European Pat. Off. . | |
| 0 360 201 | 3/1990 | European Pat. Off. | B32B 27/36 |
| 7341417 | 6/1974 | France . | |
| 838708 | 6/1960 | United Kingdom . | |
| 1487414 | 9/1977 | United Kingdom . | |

*Primary Examiner*—D. S. Nakarani
*Attorney, Agent, or Firm*—Pillsbury Madison & Sutro LLP

[57] ABSTRACT

A composite sheet having a thickness in the range from 30 to 400 μm, has an opaque crystalline polyester first layer having a deformation index of greater than or equal to 2.5%, and a transparent crystalline polyester second layer. The first layer preferably contains titanium dioxide. The composite sheet is suitable for use as a replacement for aluminium foil, being particularly useful as a lid for a container.

14 Claims, 1 Drawing Sheet

POLYMERIC SHEET

This is a continuation of application Ser. No. 08/434,322, filed on May 2, 1995, which was abandoned upon the filing hereof which is a continuation of Ser. No. 08/174,483, filed on Dec. 28, 1993, now abandoned.

BACKGROUND OF THE INVENTION

This invention relates to a polymeric sheet and, in particular, to a composite polyester sheet.

Metallic foils, such as aluminium foil, have been routinely employed as packaging materials for snack foods, bakery products, potato crisps, coffee beans etc. There is a commercial and environmental need to replace metallic foils with less costly and less energy intensive composite film structures, such as a polyester film substrate coated with a thin metallic layer. The polyester film substrate generally provides a strong, flexible packaging medium offering desirable oxygen and moisture barrier properties, and these characteristics are supplemented by the presence of the metallic layer which additionally provides a barrier to visible and ultra-violet light thereby delaying the onset of oxidative degradation to which certain packaged products are vulnerable. Unfortunately, for certain packaging applications, such as lids for yogurt pots, and lids for packaged convenience foods, eg for microwavable ready-prepared meals, the aforementioned metallised polyester films are not suitable, possessing insufficient tear resistance and/or embossibility.

SUMMARY OF THE INVENTION

We have now devised a composite sheet suitable for use as an alternative to metallic foils in so-called "lidding" applications which surprisingly exhibits a combination of high opacity, tear resistance and embossibility.

Accordingly, the present invention provides a composite sheet having a thickness in the range from 30 to 400 μm, comprising an opaque crystalline polyester first layer having a deformation index of greater than or equal to 2.5%, and a transparent crystalline polyester second layer, said deformation index measured at a temperature of 200° C. and under a pressure of 2 megaPascals.

The invention also provides a method of producing a composite sheet having a thickness in the range from 30 to 400 μm, comprising forming an opaque crystalline polyester first layer having a deformation index of greater than or equal to 2.5% and providing on a surface thereof a transparent crystalline polyester second layer, said deformation index measured at a temperature of 200° C. and under a pressure of 2 megaPascals.

The invention further provides a lid for a container comprising a composite sheet having a thickness in the range from 30 to 400 μm, which comprises an opaque crystalline polyester first layer having a deformation index of greater than or equal to 2.5%, and a transparent crystalline polyester second layer, said deformation index measured at a temperature of 200° C. and under a pressure of 2 megaPascals.

In the context of the invention the following terms are to be understood as having the meanings hereto assigned:

sheet: includes not only a single, individual sheet, but also a continuous web or ribbon-like structure capable of being sub-divided into a plurality of individual sheets.

opaque: means that the first layer of the composite sheet is substantially impermeable to visible light.

voided: indicates that the first layer of the composite sheet preferably comprises a cellular structure containing at least a proportion of discrete, closed cells.

transparent: means that the second layer of the composite sheet is substantially permeable to visible light.

film: is a self-supporting structure capable of independent existence in the absence of a supporting base.

crystalline: means that both the first layer and second layer polyester is in a highly crystalline state, preferably having a degree of crystallisation of at least 30%, preferably at least 40%, ie the polyester is not in an amorphous state.

deformation index: is the deformation, expressed as a percentage of the original thickness of the layer, observed when a film of the layer is subjected, at a temperature of 200° C., to a pressure of 2 megaPascals applied normal to the plane of the sheet by the herein described test procedure (calculating the average value of five measurements).

DESCRIPTION OF PREFERRED EMBODIMENTS

The first layer and/or second layer of a composite sheet according to the invention may be formed from any synthetic, film-forming, polyester material. Suitable thermoplastics, polyester materials include a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7- naphthalenedicarboxylic acid, succinic acid, sebacic acid, adipic acid, azelaic acid, 4,4'- diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate and/or polyethylene naphthalate film is preferred for the first and/or second layers. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent 838,708.

In a preferred embodiment of the invention both the first and second layers of the composite sheet comprise the same polyester material, preferably polyethylene terephthalate.

The first layer and/or second layer of a composite sheet according to the invention may be uniaxially oriented, but is preferably biaxially oriented by drawing in two mutually perpendicular directions in the plane of the film to achieve a satisfactory combination of mechanical and physical properties. Formation of the film may be effected by any process known in the art for producing an oriented polyester film—for example, a tubular or flat film process.

In a tubular process simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process a film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, ie the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the film-forming polyester, for example—a linear polyester is usually stretched so that the dimension of the oriented polyester film is from 2.5 to 4.5 times its original dimension in the, or each direction of stretching.

A stretched film may be, and preferably is, dimensionally stabilised by heat-setting under dimensional restraint at a temperature above the glass transition temperature of the film-forming polyester but below the melting temperature thereof, to induce crystallisation of the polyester.

Formation of a composite sheet according to the invention may be effected by conventional techniques—for example, by laminating together a preformed first layer and preformed second layer, or by casting the first or second layer polyester onto a preformed first or second layer. Conveniently, however, formation of a composite sheet (first and second layers) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polyesters are first united within a channel leading to a die manifold, and thereafter extruded together from the die orifice under conditions of streamline flow without intermixing thereby to produce a composite sheet.

The opaque polyester first layer preferably exhibits a Transmission Optical Density (TOD) (Sakura Densitometer; type PDA 65; transmission mode) in the range from 0.4 to 1.75, more preferably from 0.5 to 1.2, especially from 0.6 to 1.0, and particularly from 0.7 to 0.9. The first layer is conveniently rendered opaque by incorporation into the synthetic polyester of an effective amount of an opacifying agent. However, in a preferred embodiment of the invention the opaque first layer is voided, as hereinbefore defined. It is therefore preferred to incorporate into the polyester an effective amount of an agent which is capable of generating an opaque, voided first layer structure. Suitable voiding agents, which also confer opacity, include an incompatible resin filler, a particulate inorganic filler or a mixture of two or more such fillers.

By an "incompatible resin" is meant a resin which either does not melt, or which is substantially immiscible with the polyester, at the highest temperature encountered during extrusion and fabrication of the layer. Such resins include polyamides and olefin polymers, particularly a homo- or co-polymer of a mono-alpha-olefin containing up to 6 carbon atoms in its molecule, for incorporation into polyester films. For incorporation into a polyethylene terephthalate first layer, suitable materials include an olefin polymer, such as a low or high density homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Dispersibility of the aforementioned olefin polymer in a polyethylene terephthalate first layer may be inadequate to confer the desired characteristics. Preferably, therefore a dispersing agent is incorporated together with the olefin polymer softening agent. The dispersing agent conveniently comprises a carboxylated polyolefin, particularly a carboxylated polyethylene. Suitable carboxylated polyolefins include those having a Brookfield Viscosity (140° C.) in the range 150–100000 cps (preferably 150–50000 cps) and an Acid Number in the range 5–200 mg KOH/g (preferably 5–50 mg KOH/g), the Acid Number being the number of mg of KOH required to neutralise 1 g of polymer.

The amount of dispersing agent may be selected to provide the required degree of dispersibility, but conveniently is within a range of from 0.05 to 50%, preferably from 0.5 to 20%, by weight of the olefin polymer.

The amount of incompatible resin filler present in the first layer is preferably within the range from 2% to 30%, more preferably from 3% to 20%, especially from 4% to 15%, and particularly from 5% to 10% by weight, based on the weight of the first layer polyester.

Particulate inorganic fillers suitable for generating an opaque, preferably voided first layer include conventional inorganic pigments and fillers, and particularly metal or metalloid oxides, such as alumina, silica and titania, and alkaline metal salts, such as the carbonates and sulphates of calcium and barium.

Non-voiding particulate inorganic fillers may also be added to the film-forming polyester first layer.

Suitable voiding and/or non-voiding particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the first layer polymer.

In a particularly preferred embodiment of the invention, the inorganic filler comprises titanium dioxide.

The individual or primary titanium dioxide particles suitably have a mean crystal size, as determined by electron microscopy, in the range from 0.05 to 0.4 μm, preferably from 0.1 to 0.2 μm, and more preferably of approximately 0.15 μm. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polyester and/or film making process.

The inorganic filler, suitably aggregated titanium dioxide, preferably has a volume distributed median particle diameter (equivalent spherical diameter corresponding to 50% of the volume of all the particles, read on the cumulative distribution curve relating volume % to the diameter of the particles—often referred to as the "D(v,0.5)" value) of from 0.1 to 1.5 μm, more preferably from 0.2 to 1.2 μm, especially from 0.2 to 0.9, and particularly from 0.25 to 0.8 μm.

It is preferred that none of the filler particles incorporated into the first layer according to this invention should have an actual particle size exceeding 30 μm. Particles exceeding such a size may be removed by sieving processes which are known in the art. However, sieving operations are not always totally successful in eliminating all particles greater than a chosen size. In practice, therefore, the size of 99.9% by number of the particles should not exceed 30 μm. Most preferably the size of 99.9% of the particles should not exceed 20 μm. Preferably at least 90%, more preferably at least 95% of the filler particles, preferably titanium dioxide, are within the range of the volume distributed median particle diameter ±0.5 μm, and particularly ±0.3 μm.

The amount of filler, particularly of titanium dioxide, incorporated into the first layer desirably should be not less than 1% nor exceed 30% by weight, based on the weight of the polyester. Particularly satisfactory levels of opacity are achieved when the concentration of filler is from about 5% to 20%, especially from 10 to 15%, and particularly 12% to 13% by weight, based on the weight of the first layer polyester.

The preferred titanium dioxide filler particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as using the chloride process or preferably by the sulphate process.

In one embodiment of the invention the titanium dioxide particles are coated preferably with inorganic oxides such as aluminium, silicon, zinc, magnesium or mixtures thereof. Preferably the coating additionally comprises an organic compound, such fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

A first layer of a composite sheet according to the invention exhibits a Deformation Index (DI), as hereinbefore defined, of greater than or equal to 2.5%, and a preferred layer exhibits a DI of not greater than about 50%. Preferably a first layer exhibits a DI within a range of from 3.5% to 20%, and especially from 4.0% to 10%. Particularly desirable performance is observed with a DI of from 4.5% to 7%.

If both an incompatible resin filler, preferably a polyolefin, and a particulate inorganic filler, preferably titanium dioxide, are present in the first layer it is preferred that the concentration of the incompatible resin filler is in the range from 2% to 30%, more preferably from 3% to 20%, especially from 4% to 15%, and particularly from 5% to 10% by weight based on the weight of the first layer polyester, whilst the concentration of the particulate inorganic filler is preferably in the range from 1% to 30%, more preferably from 1% to 15%, especially from 2% to 8%, and particularly from 3% to 7% by weight, based on the weight of the first layer polyester.

The required DI may be obtained by incorporation of the aforementioned incompatible resin filler and/or particulate inorganic filler into the first layer polyester. However, in order to achieve the required DI, it may be necessary to incorporate an additional component, a dispersible polymeric softening agent, into the layer. Suitable polymeric softening agents include polymeric elastomers, such as copolyesterethers, for example block copolymers of ethylene terephthalate with ethylene glycol, n-butyl terephthalate with tetramethylene glycol, or of n-butyl terephthalate with ethylene oxide-propylene oxide.

The amount of incorporated polymeric softening agent is conveniently within a range of from 0.5% to 50%, preferably from 1.0% to 15%, and particularly from 1.5% to 10% by weight based on the weight of the first layer polyester.

In a preferred embodiment of the invention, the density of the first layer is greater than 1.30 gcm$^{-3}$, more preferably in the range from 1.35 to 1.7 gcm$^{-3}$, especially from 1.45 to 1.65 gcm$^{-3}$, and particularly from 1.5 to 1.6 gcm$^{-3}$.

The components of the first layer compositions may be mixed together in conventional manner. For example, by mixing with the monomeric reactants from which the polyester is derived, or the components may be mixed with the polyester by tumble or dry blending or by compounding in an extruder, followed by cooling and, usually, comminution into granules or chips.

The transparent polyester second layer preferably exhibits a Transmission Optical Density (TOD) (Sakura Densitometer; type PDA 65; transmission mode) of from 0.005 to 0.2, more preferably from 0.02 to 0.15, and particularly of from 0.03 to 0.1. The second layer is preferably essentially unfilled, although relatively small amounts of filler may be present to improve handleability of the film. The second layer preferably comprises less than 2%, more preferably less than 0.5%, and particularly less than 0.25% by weight of filler material, based on the weight of the second layer polyester. Any inorganic filler present in the second layer is preferably of the non-voiding type. China clay is a preferred inorganic filler for use in the second layer, such as a polyethylene terephthalate film. The filler, preferably of china clay, suitably has a volume distributed median particle diameter, measured as herein described, in the range from 0.1 to 10 μm, more preferably from 0.1 to 1.5 μm, especially from 0.2 to 3 μm, and particularly from 0.3 to 0.6 μm.

Particle size of all the filler particles described herein may be measured by electron microscope, Coulter counter, sedimentation analysis and static or dynamic light scattering. The median particle size may be determined by plotting a cumulative distribution curve representing the percentage of particle volume below chosen particle sizes and measuring the 50th percentile. The volume distributed median particle diameter of the filler particles is suitably measured using a Coulter Counter LS Particle Sizer after dispersing the filler in ethylene glycol in a high shear (eg Chemcoll) mixer.

The second layer of a composite sheet according to the invention preferably exhibits a Deformation Index (DI) less than that of the first layer. The DI of the second layer is preferably less than or equal to 4.0%, more preferably less than or equal to 3.5%, and particularly less than or equal to 2.5%.

In order to exhibit the preferred tear resistance properties, a particularly preferred composite sheet according to the invention has an ultimate tensile strength (UTS) (taking the average of transverse film stretching direction value and longitudinal film stretching direction value), measured according to ASTM D-882-88, in the range from 14 to 26 Kgmm$^{-2}$, more preferably in the range from 16 to 22 Kgmm$^{-2}$, and especially in the range from 17 to 20 Kgmm$^{-2}$.

In a preferred embodiment of the invention, the density of the second layer is in the range from 1.35 to 1.7 gcm$^{-3}$, more preferably from 1.35 to 1.45 gcm$^{-3}$.

Other additives, generally in relatively small quantities, may optionally be incorporated into the first layer and/or second layer(s). For example, optical brighteners in amounts up to 1500 parts per million to promote whiteness, and dyestuffs in amounts of up to 10 parts per million to modify colour, the specified concentrations being by weight, based on the weight of the first and/or second layer polyester(s).

The thickness of the composite sheet according to the invention is in the range from 30 to 400 μm. A composite sheet of less than 30 μm will not exhibit the opacity, tear resistance and/or embossibility required for use in lidding applications. The thickness of the composite sheet is preferably in the range from 35 to 200 μm, and especially from 50 to 100 μm. In general, the thickness of the first layer will not exceed 300 μm, and will preferably be in a range from 25 to 190 μm, and more preferably from 40 to 90 μm. The thickness of the second layer is preferably in the range from 1 to 100 μm, more preferably from 2 to 50 μm, especially from 4 to 25 μm, and particularly from 5 to 15 μm. It is a particularly surprising aspect of the present invention that composite films exhibiting the required tear resistance properties can be achieved using relatively thin, for example up to 25 μm, preferably up to 15 μm, second layers.

The ratio of the thickness of the first layer/second layer is preferably in the range from 1 to 100:1, more preferably from 2 to 50:1, especially from 3 to 25:1, and particularly from 4 to 9:1.

The composite sheet according to the invention may, for example, have an additional second layer on the remote surface of the first layer, or alternatively an additional first layer on the remote surface of the second layer. The thickness and composition of the additional first and/or second layers may be the same or different as the original first and/or second layers, depending upon the particular application required. Alternatively, additional layers other than the hereinbefore described first and second layers may be formed on a first and second layer composite sheet to provide further advantageous properties, such as ink adhesion, release characteristics, antistatic behaviour, anti-blocking etc.

In a preferred embodiment of the invention the second layer, more preferably the first layer is coated with an adherent layer comprising an acrylic resin which exhibits improved adhesion to inks and lacquers. By acrylic resin is meant a resin which comprises at least one acrylic and/or methacrylic component.

The acrylic resin is preferably thermoset and preferably comprises at least one monomer derived from an ester of acrylic acid and/or an ester of methacrylic acid, and/or derivatives thereof. In a preferred embodiment of the invention, the acrylic resin comprises greater than 50 mole %, preferably less than 98 mole %, more preferably from 60 to 97 mole %, especially from 70 to 96 mole %, and particularly from 80 to 94 mole % of at least one monomer derived from an ester of acrylic acid and/or an ester of methacrylic acid, and/or derivatives thereof. A preferred acrylic resin comprises an alkyl ester of acrylic and/or methacrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range 30 to 65 mole %, and the methacrylate monomer is preferably present in a proportion in the range of 20 to 60 mole %.

Other monomers which are suitable for use in the preparation of the acrylic resin of the adherent layer, which may be preferably copolymerised as optional additional monomers together with esters of acrylic acid and/or methacrylic acid, and/or derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid.

Other optional monomers of the acrylic resin adherent layer polymer include vinyl esters such as vinyl acetate, vinyl chloracetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic resin, derived from 3 monomers comprises 35 to 60 mole % of ethyl acrylate/30 to 55 mole % of methyl methacrylate/2–20 mole % of methacrylamide, and especially comprising approximate molar proportions 46/46/8% respectively of ethyl acrylate/methyl methacrylate/acrylamide or methacrylamide, the latter polymer being particularly effective when thermoset—for example, in the presence of about 25 weight % of a methylated melamine-formaldehyde resin.

A preferred acrylic resin, derived from 4 monomers comprises a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of a monomer containing sulphonic acid and/or a salt thereof. Ethyl acrylate is a particularly preferred monomer (a) and methyl methacrylate is a particularly preferred monomer (b). Monomer (c) containing a free carboxyl group ie a carboxyl group other than those involved in the polymerisation reaction by which the copolymer is formed, suitably comprises a copolymerisable unsaturated carboxylic acid, and is preferably selected from acrylic acid, methacrylic acid, maleic acid, and/or itaconic acid; with acrylic acid and itaconic acid being particularly preferred. The sulphonic acid monomer (d) is preferably aromatic and may be present as the free acid and/or a salt thereof, for example as the ammonium, substituted ammonium, or an alkali metal, such as lithium, sodium or potassium, salt. The sulphonate group does not participate in the polymerisation reaction by which the adherent copolymer resin is formed. The sulphonic acid monomer is preferably p-styrene sulphonic acid and/or a salt thereof.

The weight average molecular weight of the acrylic resin can vary over a wide range but is preferably within the range 10,000 to 10,000,000, and more preferably within the range 50,000 to 200,000.

The acrylic resin preferably comprises at least 30% by weight of the layer and, more preferably, between 45% and 99%, particularly between 55% and 90%, and especially between 65% and 85% by weight of the coating layer. The acrylic resin is generally water-insoluble. The adherent layer coating composition including the water-insoluble acrylic resin may nevertheless be applied to the surface of the polymeric secondary layer as an aqueous dispersion.

If desired, the adherent layer coating composition may also contain a cross-linking agent which functions to cross-link the layer thereby improving adhesion to the second, or preferably first layer. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, eg formaldehyde. A useful condensation product is that of melamine with formaldehyde. The condensation product may optionally be alkoxylated. The cross-linking agent may suitably be used in amounts of up to 60%, preferably up to 50%, more preferably in the range from 10% to 45%, and especially from 15% to 35% by weight relative to the total weight of the adherent layer. A catalyst is also preferably employed to facilitate cross-linking action of the cross linking agent. Preferred catalysts for cross-linking melamine formaldehyde include para toluene sulphonic acid, maleic acid stabilised by reaction with a base, morpholinium paratoluene sulphonate, and ammonium nitrate.

The adherent layer coating composition may be applied before, during or after the stretching operation in the production of the composite sheet. The adherent layer coating composition is preferably applied to the first layer between the two stages (longitudinal and transverse) of a thermoplastics film biaxial stretching operation. Such a sequence of stretching and coating is suitable for the production of an adherent layer coated linear composite sheet, particularly a sheet comprising a polyethylene terephthalate first layer and polyethylene terephthalate second layer(s), which sheet is preferably firstly stretched in the longitudinal direction over a series of rotating rollers, coated, and then stretched transversely in a stenter oven, preferably followed by heat setting.

An adherent layer coated composite sheet, especially having a polyethylene terephthalate first and/or second layer (s) is suitably heated from 150° C. to 240° C., preferably from 200° C. to 220° C., in order to dry the aqueous medium, or the solvent in the case of solvent-applied compositions, and also to assist in coalescing and forming the coating into a continuous and uniform layer. The cross-linking of cross-linkable coating compositions is also achieved at such temperatures.

The adherent layer coating composition is preferably applied to the second, or preferably first layer by any suitable conventional technique such as dip coating, bead coating, reverse roller coating or slot coating. hat of the substrate.

The adherent layer is preferably applied at a coat weight within the range 0.05 to 10 mgdm$^{-2}$, especially 0.1 to 2.0 mgdm$^{-2}$. For a composite sheet having an adherent layer on both of the first and second layers, each adherent layer preferably has a coat weight within the preferred range.

Prior to deposition of the adherent layer onto the first or second layer, the exposed surface thereof may, if desired, be subjected to a chemical or physical surface-modifying treatment to improve the bond between that surface and the subsequently applied adherent layer. A preferred treatment, because of its simplicity and effectiveness, is to subject the exposed surface of the first or second layer to a high voltage electrical stress accompanied by corona discharge. Alternatively, the first or second layer may be pretreated with an agent known in the art to have a solvent or swelling action on the polyester. Suitable materials include a halogenated phenol dissolved in a common organic solvent eg a solution of p-chloro-m-cresol, 2,4-dichlorophenol, 2,4,5- or 2,4 6- trichlorophenol or 4-chlororesorcinol in acetone or methanol.

The composite sheet according to the invention can be used in a wide range of "lidding" applications, such as providing lids for containers made of paper and card, glass, metal, or plastic materials such as polyethylene terephthalate, polyethylene or polypropylene. The composite sheet is particularly suitable for use as lids for containers used for food products, such as lids for yogurt pots, and packaged convenience foods, including microwavable ready-prepared meals.

BRIEF DESCRIPTION OF THE DRAWINGS

The invention is illustrated by reference to the accompanying drawings in which:

Referring to FIG. 1 of the drawings, the composite sheet comprises an opaque polyester first layer (1) having a transparent polyester second layer (2) bonded to one surface (3) thereof.

Figure 1:
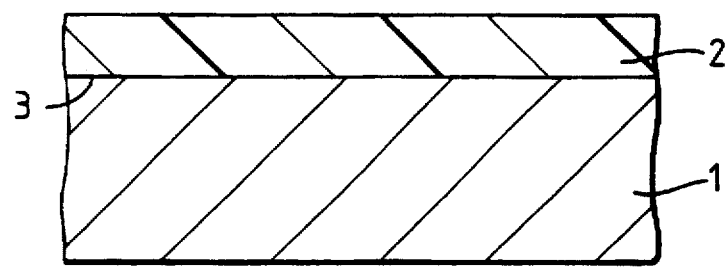
FIG. 1 is a schematic sectional elevation, not to scale, of a composite sheet having a first layer and a second layer.
Figure 2:
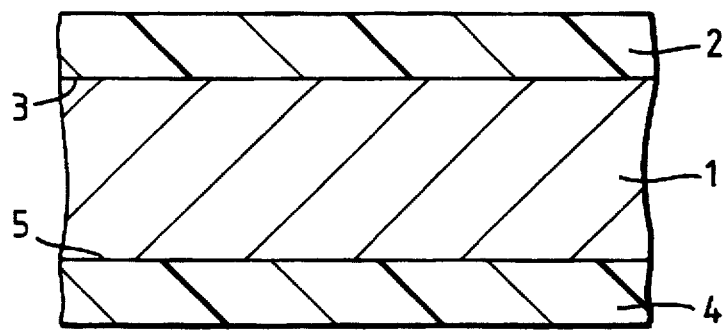
FIG. 2 is a similar schematic elevation of a composite sheet with an additional second layer on the remote surface of the first layer.

The film of FIG. 2 further comprises an additional transparent polyester second layer (4), bonded to the second surface (5) of the first layer (1).

In this specification the following test procedure has been used.

DEFORMATION INDEX

The deformation index was measured using a thermomechanical analyser, Perkin Elmer, type TMA7, with a test probe having a surface area of 0.785 mm$^2$.

A sample of the film layer, for example—a biaxially oriented polyethylene terephthalate film of 75 µm thickness, was introduced in a sample holder into the TMA7 furnace and allowed to equilibrate at the selected temperature of 200° C. The probe was loaded to apply a pressure of 0.125 megaPascals normal to the planar surface of the hot film sample and the deformation observed to be zero. The load on the probe was then increased whereby a pressure of 2 megaPascals was applied to the sample. The observed displacement of the probe under the increased load was recorded and expressed as a percentage of the thickness of the undeformed hot sample (under 0.125 megaPascals pressure). That percentage is the Deformation Index (DI) of the tested film layer material. The procedure was repeated four times with different samples of the same film, and an average value of the five measurements calculated.

The invention is further illustrated by reference to the following examples.

EXAMPLE 1

Separate streams of a first layer polymer of polyethylene terephthalate comprising 12.5% by weight of the polymer of titanium dioxide having a volume distributed median particle diameter of 0.3 µm, and a second layer polymer of polyethylene terephthalate comprising 0.15% by weight of the polymer of china clay having a volume distributed median particle diameter of 0.4 µm, were supplied from separate extruders to a single channel coextrusion assembly. The volume distributed median particle diameter of the filler particles was measured using a Coulter Counter LS Particle Sizer after dispersing the filler in ethylene glycol in a high shear (eg Chemcoll) mixer. The polymer layers were extruded through a film-forming die onto a water cooled rotating, quenching drum to yield an amorphous cast composite extrudate. The cast extrudate was heated to a temperature of about 80° C. and then stretched longitudinally at a forward draw ratio of 3.2:1. The composite sheet was passed into a stenter oven, where the sheet was dried and stretched in the sideways direction to approximately 3.4 times its original dimensions. The biaxially stretched composite sheet was heat set at a temperature of about 225° C. Final film thickness of the composite sheet was 75 μm. The first layer was 65 μm thick, and the second layer was 10 μm thick.

The composite sheet was subjected to the test procedures described herein and exhibited the following properties.
i) Transmission Optical Density (TOD)=0.85
ii) Deformation Index (DI)=5.1%
iii) Ultimate Tensile Strength (UTS)=18.5 Kgmm$^{-2}$ The composite sheet was embossed by passing the sheet through dimple nip rollers. The composite sheet maintained the impression of the rollers, resulting in an aesthetically pleasing appearance. The resultant embossed composite sheet was also suitable for processing through a standard commercial lid making machine. Lids formed from the composite film possessed the light-shielding property, tear resistance property and embossibility required of a polymeric film replacing the traditionally used aluminium foil.

EXAMPLE 2

This is a comparative example not according to the invention. The procedure of Example 1 was repeated except that the second polymer layer was extruded on its own to form a single layer film of 75 μm thickness.

The polymeric film was subjected to the test procedures described herein and exhibited the following properties.
i) Transmission Optical Density (TOD)=0.07
ii) Deformation Index (DI)=2.4%
iii) Ultimate Tensile Strength (UTS)=19.7 Kgmm$^{-2}$ An attempt was made to emboss the film by passing the film through dimple nip rollers, but the film did not maintain the impression of the rollers. The film was not suitable for processing through a standard commercial lid making machine.

EXAMPLE 3

The procedure of Example 1 was repeated except that the surface of the first layer was coated, between the longitudinal and sideways film stretching stages, with an adherent layer coating composition comprising the following ingredients:

| | |
|---|---|
| Acrylic resin (46% w/w aqueous latex of methyl methacrylate/ethyl acrylate/methacrylamide: 46/46/8 mole %, with 25% by weight methoxylated melamine-formaldehyde) | 163 ml |
| Ammonium nitrate (10% w/w aqueous solution) | 6 ml |
| Synperonic NDB (13.7% w/w aqueous solution of a nonyl phenol ethoxylate, supplied by ICI) | 7 ml |
| Demineralised water | to 2.5 liters |

The dry coat weight of the adherent layer was approximately 0.4 mgdm$^{-2}$ and the thickness of the coating layer was approximately 0.4 μm.

The strength of adhesion of a subsequently applied organic solvent based cellulose acetate butyrate (CAB) lacquer to the adherent layer coated composite sheet was measured using a standard cross-hatch adhesion test. The lacquer was coated using a Meyer bar, and cured in an oven at 120° C. for one minute prior to testing. Cellulose acetate butyrate (CAB) lacquer containing the following ingredients by weight was used:

| | |
|---|---|
| Eastman Kodak 3 Seconds 272/3 resin (CAB) | 15.0 parts |
| Methyl isobutyl ketone (MIBK) | 42.5 parts |
| Methyl ethyl ketone (MEK) | 42.5 parts |
| Rhodamine dye | 0.06 parts |

The results were determined as the number of squares remaining (a maximum of 100) after one pull of adhesive tape. If 98 or more squares out of a 100 remain after the adhesive tape has been pulled off the film, the adhesion is acceptable and the film is designated a "pass". If less than 98 squares remain, the adhesion is unacceptable and the film is designated a "fail".

The CAB lacquer adhesion test performed on the adherent layer coated composite sheet of this example was designated a "pass".

The above results illustrate the improved properties of composite sheets according to the present invention.

We claim:

1. A biaxially oriented composite sheet suitable for use in lidding, said sheet having a thickness in the range from 30 to 400 μm, said sheet consisting essentially of an opaque crystalline polyester first layer having a deformation index of greater than or equal to 2.5%, and a transparent crystalline polyester second layer directly bonded to said first layer, said deformation index being measured at a temperature of 200° C. and under a pressure of 2 megaPascals and said biaxially oriented composite sheet having an ultimate tensile strength of from 14 to 26 Kg/mm$^2$.

2. A composite sheet according to claim 1 wherein the first layer has a Transmission Optical Density in the range from 0.4 to 1.75.

3. A composite sheet according to claim 1 wherein the first layer contains from 1 to 30% by weight titanium dioxide based on the weight of the first layer polyester.

4. A composite sheet according to claim 3 wherein the titanium dioxide is present in the first layer at a concentration within the range from 5% to 20% by weight, based on the weight of the first layer polyester.

5. A composite sheet according to claim 3 wherein the titanium dioxide has a volume distributed median particle diameter in the range from 0.2 to 0.9 μm.

6. A composite sheet according to claim 1 wherein the ratio of the thickness of the first layer/second layer is in the range from 3 to 25:1.

7. A composite sheet according to claim 1 wherein both the first layer and second layer comprise the same polyester.

8. A composite sheet according to claim 1 wherein at least one of the first layer and second layer has on a surface thereof remote from the other layer, an adherent layer comprising an acrylic resin.

9. A composite sheet according to claim 1 wherein the second layer ranges in thickness from 1 to 100 μm.

10. A composite sheet according to claim 1 wherein the second layer ranges in thickness from 1 to 100 μm and the of the thickness of the first layer/second layer is in the range of 2 to 50:1.

11. A biaxially oriented composite sheet having a thickness in the range from 30 to 400 μm, said sheet being suitable for lidding and consisting essentially of an opaque crystalline polyester first layer having a deformation index of greater than or equal to 2.5%, in direct contact with a transparent crystalline polyester second layer, said deformation index measured at a temperature of 200° C. and under a pressure of 2 megaPascals, said layers being co-extruded and said composite sheet having an ultimate tensile strength in the range of from 14 to 26 Kgmm$^{-2}$ and being further characterized by its opacity, tear resistance and embossibility.

12. A lid for a container consisting essentially of a biaxially oriented composite sheet of claim 11.

13. A method for producing a biaxially oriented composite sheet having a thickness in the range from 30 to 400 µm, comprising forming an opaque crystalline polyester first layer having a deformation index of greater than or equal to 2.5%, bonding on a surface thereof a transparent crystalline polyester second layer and then biaxially orienting each of said layers, said deformation index being measured at a temperature of 200° C. and under a pressure of 2 megaPascals and said biaxially oriented composite sheet having an ultimate tensile strength of from 14 to 26 Kg/mm$^2$.

14. The method of claim 13 wherein the layers are co-extruded simultaneously and biaxially oriented.

* * * * *